Patented Apr. 22, 1924.

1,491,672

UNITED STATES PATENT OFFICE.

GEORGES CLAUDE, OF PARIS, FRANCE, ASSIGNOR TO L'AIR LIQUIDE SOCIETE ANONYME POUR L'ETUDE ET L'EXPLOITATION DES PROCEDES GEORGES CLAUDE, OF PARIS, FRANCE.

PROCESS FOR THE CONVERSION OF SYNTHETIC AMMONIA INTO SOLID AMMONIUM CHLORIDE IN CONJUNCTION WITH THE PRODUCTION OF SODIUM CARBONATE.

No Drawing. Application filed July 9, 1919. Serial No. 309,735.

*To all whom it may concern:*

Be it known that I, GEORGES CLAUDE, a citizen of the French Republic, residing at 48 Rue St. Lazare, Paris, in the Republic of France, have invented certain new and useful Improvements in Processes for the Conversion of Synthetic Ammonia into Solid Ammonium Chloride in Conjunction with the Production of Sodium Carbonate, of which the following is a specification.

The present invention has for its object certain improvements in the process of transformation of synthetic ammonia into a transportable product, directly utilizable for agriculture in conjunction with the production of sodium carbonate, which formed the subject matter of my prior application for Letters Patent Serial No. 222,506.

The process according to this prior application is essentially characterized by the utilization of the carbon dioxide obtained at the time of manufacturing the water gas which serves for the manufacture of the hydrogen intended for the synthesis, the said carbon dioxide (in the presence of sea salt and synthetic ammonia) converting the sea salt into ammonium chloride, a solid product easy to transport and rendered directly applicable to agriculture by a neutralization or equivalent operation and furthermore converting the sea salt into sodium bi-carbonate, which, in carrying out the process, is subsequently brought to the state of sodium carbonate.

If the invention in question be referred to, it will be seen that the cycle claimed is quite distinct from that of the processes of the Solvay kind. These, besides the ammonia, the common salt and the coal, borrow from another substance, limestone, its carbon dioxide, while the lime necessary for the regeneration of the ammonia, combined with the chlorine of the common salt, is ultimately lost.

The cycle claimed in my prior application above referred to endeavours on the contrary to find all its resources in a minimum of raw materials and to transform the whole of them into useful products. These raw materials being salt, water, coal and air, it is aimed at producing with the coal the carbon dioxide necessary for the preparation of the soda and the products obtained, sodium carbonate and ammonium chloride, represent, at least qualitatively, the whole of the elements of the raw material brought into play. As compared with the Solvay processes there is one raw material the less, i. e., the limestone, and two useful products, sodium carbonate and ammonium chloride, are obtained in place of one single one.

Another important point about the invention claimed in my prior United States application above mentioned is that the ammonium chloride which is obtained has to be utilized as a fertilizer.

Now in general this ammonium chloride is dissolved and mixed with the sodium carbonate and ammonia and fractional crystallizations or precipitations are not successful in obtaining it sufficiently free from common salt and alkali for the requirements of agriculture. The invention has therefore to consider also this special point of view.

There is yet another point of view which must be pointed out and which has not been in my prior application Serial No. 222,506 above referred to. In the Solvay soda industry, the ammonium chloride has not been brought into a solid form, since the ammonia is recovered directly from the solution.

The object aimed at by the present invention is on the contrary to extract the ammonium chloride as well as the sodium bi-carbonate, in a solid form. It is desirable to avoid the evaporation of the solutions, which would be very expensive. The method of working is, broadly, that of the process described in the German patent to Schreib, No. 36,093, dated the 14th of June, 1885. The process described in this patent consists, when the precipitation of the bi-carbonate is effected, in saturating the mother liquors with common salt, adding ammonia thereto, in transforming the salt by carbon dioxide into neutral carbonate and cooling down. Almost the whole of the ammonium chloride is precipitated. Salt may then be re-dissolved in the solution, bi-carbonated, and so on, so that a given quantity of liquid may furnish, successively, without evaporation, very large quantities of bi-carbonate and ammonium chloride, in the solid state.

The present invention comprises modifications of this process by reason of the special means brought into play and of the special object aimed at.

First of all, by working according to Schreib, that is to say, by saturating the mother liquors by passing them into a mass of solid salt, a partial precipitation of the ammonium chloride on the salt employed is brought about. Furthermore, at the time of the subsequent carbonation, a portion of the salt is precipitated with the ammonium chloride and the impurities. In order to avoid this double disadvantage, the present process consists in adding to the mother liquors from a previous operation, instead of an excess of common salt, such a quantity of this substance that it remains dissolved during the whole of the duration of the subsequent operations and consequently does not become mixed with the ammonium chloride subsequently precipitated. A quantity of ammonia is then added which is converted into mono-carbonate by added carbon-dioxide. The solution is cooled down, according to the means the peculiarities of which are explained below and the ammonium chloride is thus precipitated in a state of great purity. Common salt may then be dissolved in the solution, the latter again saturated with carbon dioxide, in order to precipitate the soda and the same cycle of operations repeated. The ammonium chloride obtained contains however even after having been centrifuged, some alkaline mother liquors and this alkalinity would play an injurious part for agriculture. In order to avoid this, according to the present invention, the ammonium chloride is brought to a temperature of nearly 70 degrees. At this temperature, the sodium carbonates of the mother liquors re-act on the ammonium salt and produce carbonate of ammonia which is eliminated by the heat, at the same time as that which existed already in the said mother liquors and the ammonium chloride, perfectly neutral, does not contain more than from 1 to 3 per cent of common salt, resulting from the transformation of the bi-carbonate and insufficient to injure the quality of the product.

After a certain number of alternate precipitations of bi-carbonate and ammonium chloride, all the impurities of the salt become concentrated in the mother liquors and in particular the magnesium salts. The impurities can be eliminated and the liquid brought back into condition to serve by a suitable process which takes account of the fact that the object is here to prepare fertilizers. The magnesium, for example, will be precipitated in the form of ammonio-magnesium phosphate in the ammoniacal liquors from which the chloride of ammonium is deposited. It will therefore be found along with this latter.

Two other important perculiarities result from the special conditions of the operation and are also claimed. When the synthetic ammonia is extracted from the apparatus directly in the liquid form, (which is the case in particular when high pressures are employed to produce it) its passage from the liquid to the gaseous state produces a considerable amount of cold which may be utilized for the cooling down of the solution from which the ammonium chloride is deposited. It is necessary therefore to take care not to send the liquid ammonia directly into the bath in which it is carbonated, as there would be a simple neutralization of the cold in question by the heat of solution or reaction, which will be much more rationally eliminated by a circulation of water.

The ammonia is consequently evaporated in contact with the solution of ammonium chloride to be cooled down and this gaseous ammonia is sent into another vat where its solution is accomplished in the cooled brine by a circulation of water. If it is necessary, the quantities of cold available can be augmented by utilizing the expansion with production of external recoverable work of the ammonia.

A similar observation might be made with regard to the use of the carbon dioxide intended for the precipitation of the soda, inasmuch as this carbon dioxide may be produced in the solid or liquid state from which state it will have to be brought back to the gaseous state in heat interchanging relation with the liquid to be cooled down, to be sent in the gaseous state into the receptacle where it produces the precipitation.

In cases where the solid or liquid carbon dioxide produced by the process would be insufficient, it is possible, while yet keeping within the scope of the invention, to utilize in particular carbon dioxide produced by the combustion of carbonic oxide from water gas.

What I claim and desire to secure by Letters Patent of the United States is:—

1. Process for the conversion of synthetic ammonia into a solid ammonium chloride in conjunction with the production of sodium carbonate, consisting in: (1) adding to the mother liquor from which sodium bi-carbonate has been precipitated by the reaction of ammonia, carbon dioxide and dissolved common salt, a quantity of common salt such that this salt will remain dissolved during the entire duration of the subsequent operations, then adding ammonia, then the quantity of carbon dioxide necessary to transform the common salt into neutral carbonate, cooling the solution so as to precipitate the ammonium chloride, the cooling being effected by the cold produced by passing vaporizing liquid ammonia in heat interchanging relation with the solution; (2) heating the solution, dissolving common salt therein, and sending a current of carbon dioxide into the solution to precipitate the sodium bicarbonate; (3) repeating on the mother liquors the operations specified above under (1) and (2) and so on, substantially as described.

2. Process for the conversion of synthetic ammonia into a solid ammonium chloride in conjunction with the production of sodium carbonate, consisting in: (1) adding to the mother liquor from which sodium bicarbonate has been precipitated by the reaction of ammonia, carbon dioxide and dissolved common salt, a quantity of common salt such that this salt will remain dissolved during the entire duration of the subsequent operations, then adding ammonia, then the quantity of carbon dioxide necessary to transform the common salt into neutral carbonate, cooling the solution by passing non-gasified carbon dioxide in heat interchanging relation with the solution thereby precipitating ammonium chloride and gasifying the carbon dioxide; (2) heating the solution, dissolving common salt therein and sending the gasified current of carbon dioxide into the solution to precipitate the sodium bicarbonate, the carbon dioxide by reason of it being previously in a non-gasified state, being passed through a tubular system immersed in the above solution which is to deposit the ammonium chloride so as to bring the carbon dioxide into a gaseous state, this incidentally effecting cooling of said solution; (3) repeating on the mother liquors the operations specified above under (1) and (2) and so on, substantially as described.

3. Process for the conversion of synthetic ammonia into a solid ammonium chloride in conjunction with the production of sodium carbonate, consisting in: (1) adding to the mother liquor from which sodium bicarbonate has been precipitated by the reaction of ammonia, carbon dioxide and dissolved common salt, a quantity of common salt such that this salt will remain dissolved during the entire duration of the subsequent operations, then adding ammonia, then the quantity of carbon dioxide necessary to transform the common salt into neutral carbonate, cooling the solution by passing liquid ammonia and non-gasified carbon dioxide in heat interchanging relation thereto, so as to precipitate the ammonium chloride; (2) heating the solution, dissolving common salt therein, and sending a current of carbon dioxide into the solution to precipitate the sodium bicarbonate; (3) repeating on the mother liquors the operations specified above under (1) and (2) and so on; (4) bringing the ammonium chloride obtained and still containing alkaline mother liquors to a temperature of nearly 70 degrees centigrade in order to destroy the alkalinity thereof.

GEORGES CLAUDE.